(12) United States Patent  
Rudd et al.

(10) Patent No.: US 9,000,391 B2  
(45) Date of Patent: Apr. 7, 2015

(54) WELD JOINT DESIGN FOR AUTOMATIC WELDING OF TUBULAR DETECTORS

(71) Applicant: General Electric Company, Schenectady, NY (US)

(72) Inventors: Jeffrey Roy Rudd, Akron, OH (US); Benjamin John Olechnowicz, Stow, OH (US); Stephen William Manring, Sunbury, OH (US)

(73) Assignee: General Electric Company, Schenectady, NY (US)

( * ) Notice: Subject to any disclaimer, the term of this patent is extended or adjusted under 35 U.S.C. 154(b) by 340 days.

(21) Appl. No.: 13/916,626

(22) Filed: Jun. 13, 2013

(65) Prior Publication Data

US 2014/0367580 A1    Dec. 18, 2014

(51) Int. Cl.
| | |
|---|---|
| *G01T 3/00* | (2006.01) |
| *B23K 33/00* | (2006.01) |
| *B23K 9/00* | (2006.01) |
| *B23K 9/028* | (2006.01) |
| *B23K 9/235* | (2006.01) |
| *B23K 26/20* | (2014.01) |
| *B23K 26/28* | (2014.01) |
| *B23K 26/30* | (2014.01) |
| *H01J 47/00* | (2006.01) |
| *H01J 47/12* | (2006.01) |

(52) U.S. Cl.
CPC ............ *G01T 3/008* (2013.01); *B23K 33/002* (2013.01); *B23K 9/0026* (2013.01); *B23K 9/0286* (2013.01); *B23K 9/235* (2013.01); *B23K 26/206* (2013.01); *B23K 26/285* (2013.01); *B23K 26/421* (2013.01); *B23K 33/006* (2013.01); *H01J 47/002* (2013.01); *H01J 47/12* (2013.01)

(58) Field of Classification Search
CPC .......................................................... G01T 3/00
USPC ..................................................... 250/390.01
See application file for complete search history.

(56) References Cited

U.S. PATENT DOCUMENTS

| | | | |
|---|---|---|---|
| 3,381,131 | A | 4/1968 | Meal et al. |
| 4,383,175 | A | 5/1983 | Toepke |
| 5,796,109 | A | 8/1998 | Frederick et al. |
| 6,303,892 | B1 | 10/2001 | Farwer |

FOREIGN PATENT DOCUMENTS

| | | |
|---|---|---|
| DE | 102011077689 A1 | 11/2003 |
| DE | 102011077689 A1 | 12/2012 |
| JP | S4860000 | 7/1973 |
| JP | 555073468 A | 6/1980 |

OTHER PUBLICATIONS

International Search Report for PCT/US2014/039894 with mail date of Nov. 27, 2014.

*Primary Examiner* — David Porta  
*Assistant Examiner* — Hugh H Maupin  
(74) *Attorney, Agent, or Firm* — Cooper Legal Group, LLC (57) ABSTRACT

A detector includes an outer shell having a shell profile in which a welded portion of the shell profile extends as an annular flange in an outward direction relative to a center axis of the outer shell. The detector further includes an end cap positioned adjacent the welded portion of the outer shell. The end cap and the welded portion of the outer shell are welded together to form a seal. A method of making a detector is also provided.

20 Claims, 8 Drawing Sheets

WELD JOINT DESIGN FOR AUTOMATIC WELDING OF TUBULAR DETECTORS

FIELD OF THE INVENTION

The present invention relates generally to a tubular structure, such as a gas filled detector that requires a sealed joint and, in particular, to a welding operation and associated structure for construction of the detector.

DISCUSSION OF THE PRIOR ART

Detectors for rays and ions/particles (e.g., neutrons, gamma rays and the like) include an axially-extending anode surrounded by an outer cathode shell. For some detectors, such as for neutron detection, one or more gases are disposed within the outer cathode shell. In a neutron detector, ions/particles resulting from neutron reactions within the outer cathode shell will collide with the gas(es) to form free electrons. These free electrons are drawn to the anode, whereupon the free electrons generate a signal that is indicative of a neutron count.

Figure 1A:
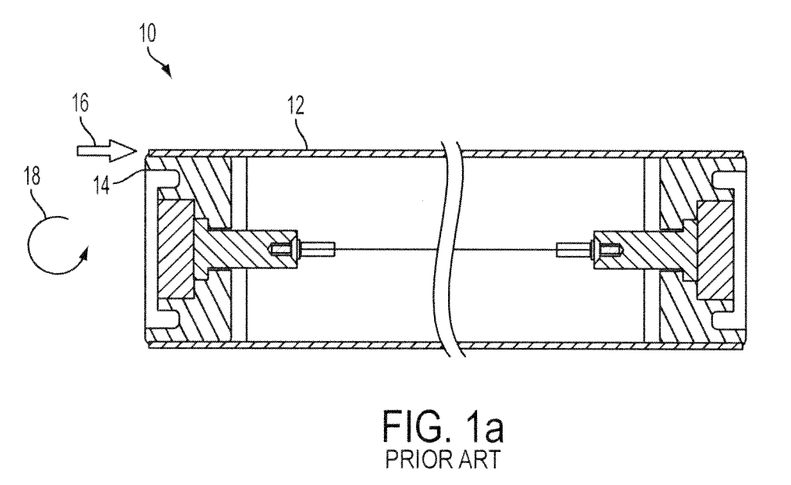
FIG. 1a is a sectional view of an example of a known, prior art neutron detector.

As can be appreciated, there is a need to retain the gas(es) within the outer cathode shell (i.e., to prevent the egress of the gas(es)) and to prevent the ingress of air, moisture, contaminants, etc. It is known to weld some parts of a detector and thus form a seal. An example of a previously known neutron detector 10 is shown in FIG. 1a. The neutron detector 10 includes a cylindrical outer shell cathode 12 and an end cap 14. A welding source 16 is applied longitudinally parallel to an elongate axis of the neutron detector 10 (i.e., parallel to the longitudinal extent of the outer shell 12). The welding source 16 would weld and seal the outer shell 12 to the end cap 14, with the welding source 16 and/or neutron detector 10 being moved/rotated substantially 360° in a revolution/rotation direction. The revolution/rotation is schematically shown by the curved-line arrowhead 18 within FIG. 1a. The welding source 16 suffers from a disadvantage of being manually controlled and possibly manually moved, which is a relatively slow and inefficient process.

Figure 1B:
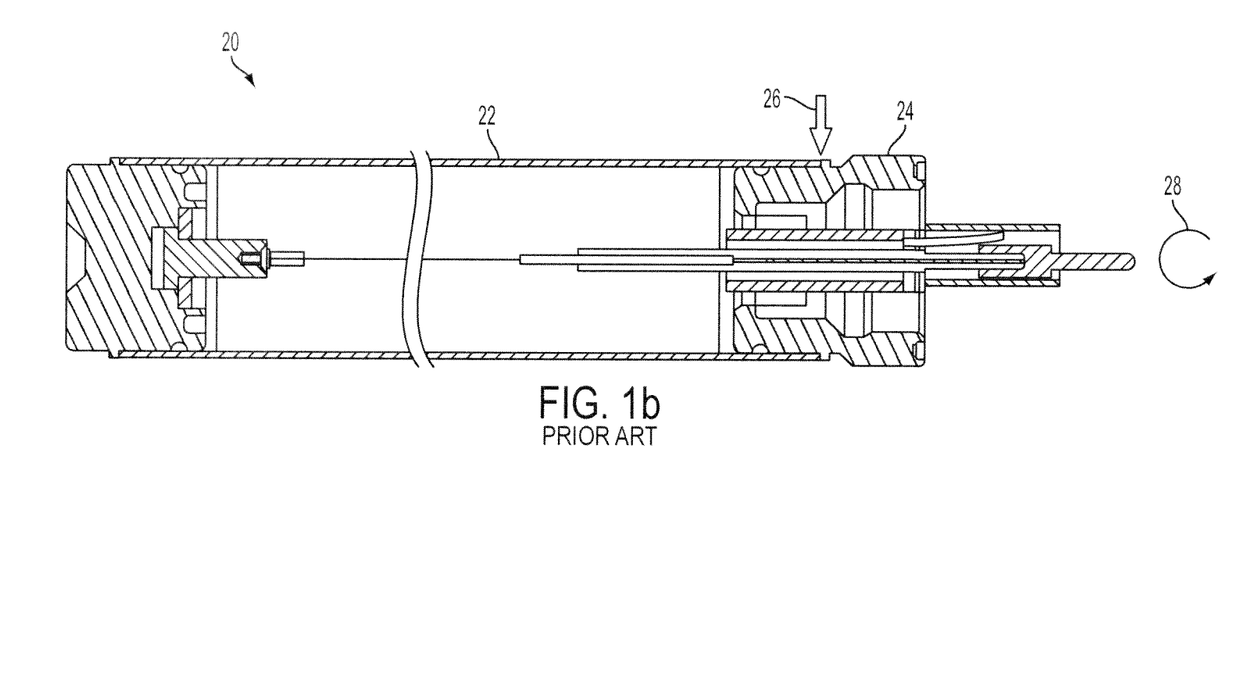
FIG. 1b is a sectional view of a second example of a known, prior art neutron detector.

Turning now to FIG. 1b, a second example of a previously known neutron detector 20 is shown. Again, the neutron detector 20 includes an outer shell 22 and an end cap 24. In this known example, a welding source 26 was applied from a radially outward direction with respect to the neutron detector 20. The welding source 26 welds and seals the outer shell 22 to the end cap 24, with either the welding source 26 or neutron detector 20 being rotated substantially 360° in a rotation direction. See the curved-line arrowhead 28 that represents the rotation. While the welding source 26 in this example was included as part of an automated operation, the outer shell 22 and end cap 24 are formed of different materials and have different dimensions (e.g., radial thicknesses), and thus have different heating temperatures/requirements to accomplish a weld melt. Further, when the outer shell 22 and end cap 24 are made from aluminum material, an aluminum oxide layer would often form on a surface of the outer shell 22 and end cap 24. The aluminum oxide layer requires a different heating temperature for welding as compared to the base aluminum material of the outer shell 22 and end cap 24. For these reasons and due to the relative thinness of the outer shell 22, undesirable welds could result between the outer shell 22 and end cap 24 with un-fused portions, commonly referred to as cracks, possibly being present. Accordingly, there is a need and it would be beneficial to provide automated welding of tubular members, such as neutron detectors, with an improved weld formed between the outer shell and end cap.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, the present invention provides a detector including an outer shell having a shell profile in which a welded portion of the shell profile extends as an annular flange in an outward direction relative to a center axis of the outer shell. The detector includes an end cap positioned adjacent the welded portion of the outer shell. The end cap and the welded portion of the outer shell are configured to be welded together to form a seal.

In accordance with another aspect, the present invention provides a detector that includes an outer shell, acting as a cathode, extending along an axis. The outer shell has a shell profile in which a welded portion of the shell profile extends as an annular flange in a radially outward direction relative to the axis. The detector includes an anode extending along the axis within the outer shell. The detector includes an end cap supporting the anode and extending within an end of the outer shell. The end cap includes a cap profile that matches the shell profile of the outer shell. The end cap includes a welded annular shoulder that extends radially outward with relative to the axis. The welded shoulder and the welded portion of the outer shell are adjacent to each other and welded together to form a seal.

In accordance with another aspect, the present invention provides a method of making a detector that includes providing an outer shell, acting as a cathode, extending along an axis. The method includes providing an anode extending along the axis within the outer shell. The method includes positioning an end cap within an end of the outer shell to support the anode. The end cap includes a cap profile in which a shoulder of the end cap extends in a radially outward direction. The method includes crimping a portion of the outer shell to form a shell profile that matches the cap profile of the end cap. A welded portion of the outer shell extends in a radially outward direction adjacent to the shoulder of the end cap. The method includes welding the welded portion of the outer shell and shoulder of the end cap together from the radially outward direction.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF THE INVENTION

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Figure 2:
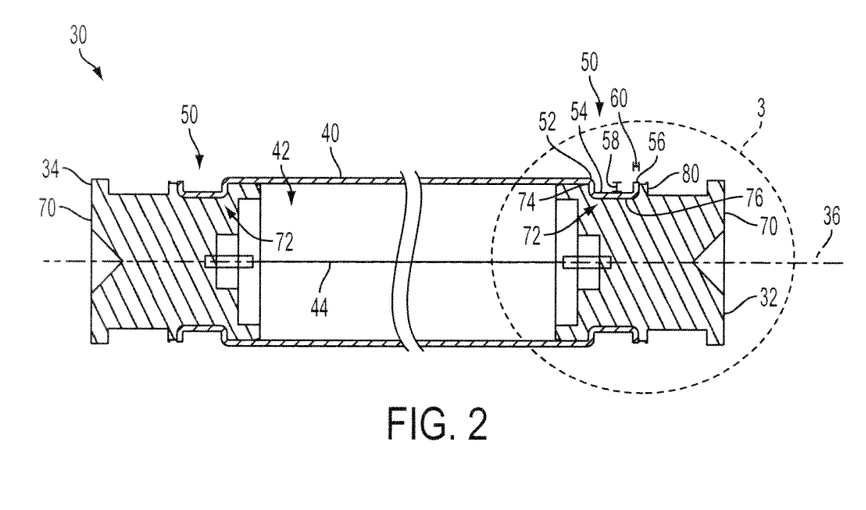
FIG. 2 is a sectional view of an example neutron detector in accordance with an aspect of the present invention.

FIG. 2 depicts an example embodiment of a sealed, tubular body or member in the form of a neutron detector 30 in accordance with at least one aspect of the invention. It is to be appreciated that FIG. 2 merely shows one example of the possible structure/configuration of the neutron detector 30, and that other examples are contemplated within the scope of the present invention. In general, the neutron detector 30 is used for measuring radiation or monitoring/detecting neutrons in an environment. For example, the neutron detector 30 can be used in association with radiation safety applications, radiation monitoring of spent nuclear fuel, homeland security applications, etc. Of course, the neutron detector 30 is not limited to these applications, and could be used in other applications that involve monitoring/detecting neutrons. Also, the present invention can be utilized within other detectors having similar constructions and is thus not limited to neutron detectors.

Turning to a general discussion of the neutron detector 30 and the operation thereof, the neutron detector 30 extends longitudinally between a first end 32 and an opposing second end 34. The neutron detector 30 in this example extends along a generally linear axis 36, though in further examples, the neutron detector 30 may include bends, curves, undulations, or the like. Similarly, the neutron detector 30 is not limited to the shown dimensions, and in other examples, could be longer/shorter or larger/smaller than as shown. Likewise, the neutron detector 30 can be housed within a housing or other similar structure.

The neutron detector 30 includes an outer shell 40. The outer shell 40 has a generally circular cross-sectional shape extending between the first end 32 and the second end 34 of the neutron detector 30. In other examples, the outer shell 40 is not limited to the circular cross-sectional shape, and instead could include elliptical, quadrilateral (e.g., square, rectangular, etc.), rounded cross-sectional shapes, or the like. The outer shell 40 includes any number of materials, including metals (e.g., aluminum, stainless steel, etc.). In one example, the outer shell 40 acts as a cathode.

The outer shell 40 bounds a substantially hollow interior volume 42. The interior volume 42 is sealed and filled with a gas or a mixture of gases. The interior volume 42 can be filled in any number of ways. In one possible example, a fill tube can be provided that extends through a portion of the neutron detector 30. In such an example, the fill tube is generally hollow and can convey/transport gas (or a mixture of gases) from an exterior location from the neutron detector 30 to the interior volume 42. Though not shown in the example, the fill tube can be provided at any number of locations within the neutron detector 30, such as by extending through the end cap, or the like. An anode 44 is positioned to extend through the interior volume 42. In the shown example, the anode 44 includes a wire, or at least has similar proportions to a wire. However, the anode 44 is not limited to the size or shape of the shown example, and could have a larger or smaller cross-sectional size. The anode 44 extends generally along the axis 36 of the outer shell 40, though in other examples, the anode 44 could be off-center from the central axis. The anode 44 can be constructed of various metals, including stainless steel, aluminum, etc.

In operation, the neutron detector 30 detects the presence/quantity of neutrons. In particular, the outer shell 40, acting as a cathode, is maintained at a first voltage while the anode 44 is maintained at a second voltage. As ions or particles resulting from neutron reactions pass through the interior volume 42, free electrons are created from collisions with the gas(es). These free electrons are drawn toward either or both of the outer shell 40 or anode 44. Due to a voltage difference between the outer shell 40 and the anode 44, the electrons drawn will produce a current that is indicative/proportional to the neutron count within the neutron detector 30.

To limit the gas(es) from escaping the interior volume 42, the outer shell 40 is welded and thus sealed. In particular, to assist in forming the weld/seal, the outer shell 40 includes a shell profile 50 located at each opposing end. It is to be appreciated that the following description of the shell profile 50 will be limited to the shell profile 50 located near the first end 32 (or right end, as illustrated in FIG. 2) of the neutron detector 30. However, the shell profile 50 located near the second end 34 (or left end, as illustrated in FIG. 2) of the neutron detector 30 is generally similar in size, structure, and shape, and is being a mirror image of the first end 32. As such, the following description of the shell profile 50 at the first end 32 is generally applicable with respect to the shell profile 50 at the second end 34 of the neutron detector 30.

The shell profile 50 includes a shell projection 52 and a recess 54. The shell projection 52 is positioned adjacent the recess 54 and defines a larger cross-sectional size (e.g., diameter) than the adjacent recess 54. In this example, the shell projection 52 is positioned closer towards a longitudinal center of the outer shell 40 than the recess 54, while the recess 54 is positioned closer to the end (e.g., first end 32) of the outer shell 40. It is to be appreciated that the respective cross-sectional sizes of the shell projection 52 and recess 54 are not limited to the example of FIG. 2. Indeed, the projection 52 and recess 54 could each be larger or smaller in cross-sectional size than as shown. In one example, the recess 54 has a longitudinal length of approximately 5.842 millimeters (~0.23 inches), though other lengths are envisioned.

The shell profile 50 further includes a welded portion 56. The welded portion 56 is positioned adjacent the recess 54 opposite the shell projection 52. In this example, the welded portion 56 is an annular flange that extends in a radially outward direction away from the axis 36. As such, an end of the welded portion 56 defines a larger cross-sectional size (e.g., diameter) than the adjacent recess 54. In one example, the welded portion 56 includes a radial length 58 that is approximately 1.5 millimeters (~0.06 inches). In such an example, a thickness 60 of the outer shell 40 is approximately 0.9 millimeters (~0.035 inches). Accordingly, in this example, an aspect ratio, defined as the radial length 58 of the welded portion 56 to the thickness 60 of the outer shell 40, is approximately 1.66 (e.g., 1.5/0.9). In other examples, however, the aspect ratio may be greater than or equal to 1.0.

To assist in sealing the interior volume 42, the outer shell 40 is attached to an end cap 70. In the shown example, one end cap 70 is positioned at the first end 32 of the neutron detector 30 while another end cap 70 is positioned at the second end 34 of the neutron detector 30. Since the end caps 70 are generally similar to each other, the following discussion will be limited to the end cap 70 at the first end 32.

The end cap 70 is a longitudinally extending plug-type structure that can be attached to a respective end (e.g., first end 32 or second end 34) of the outer shell 40. The end cap 70 has an outer cross-sectional size and shape that generally matches the inner cross-sectional size and shape of the outer shell 40. As such, the end cap 70 extends radially within the outer shell 40 such that the end cap 70 will limit the passage of gas(es), air, moisture, debris, or other unintended items into and out of the interior volume 42. In this example, the end cap 70 has a generally circular cross-sectional shape to match the circular cross-sectional shape of the outer shell 40, though other shapes (e.g., quadrilateral, oval, etc.) are envisioned. The end cap 70 includes any number of materials, including metals (e.g., aluminum, stainless steel, etc.).

The end cap 70 can be inserted at least partially into the interior volume 42 of the outer shell 40. As shown, the end cap 70 can support the anode 44, such as by holding and/or being attached to the anode 44. To further enhance the plugging characteristics of the end cap 70, the end cap 70 is attached (e.g., sealed, welded, adhesively bonded, brazed, etc.) to the outer shell 40. More particularly, in one example, the end cap 70 is welded to the outer shell 40 to form a hermetic seal. In one example, the end cap 70 can be welded to the outer shell 40 generally around the entire circumference of the end cap 70.

To assist in the welding, the end cap 70 includes a cap profile 72. The cap profile 72 generally matches that of the shell profile 50, such that the cap profile 72 and shell profile 50 will engage and mate with each other. In one example, as will be described below, separate forces are applied to the outer shell 40 towards the first end 32 and second end 34 so as to crimp the outer shell 40 onto the cap profile 72 and form the shell profile 50 to match the cap profile 72.

The cap profile 72 includes a cap projection 74 and a cap recess 76. The cap projection 74 is positioned adjacent the cap recess 76 and defines a larger cross-sectional size (e.g., diameter) than the adjacent cap recess 76. In this example, the cap projection 74 is positioned closer towards the longitudinal center of the outer shell 40 than the cap recess 76. It is to be appreciated that the respective cross-sectional sizes of the cap projection 74 and cap recess 76 are not limited to the example of FIG. 2. Indeed, in other examples, the cap projection 74 and the cap recess 76 could be larger or smaller in cross-sectional size than as shown.

The cap profile 72 further includes a shoulder 80. The shoulder 80 is positioned adjacent the cap recess 76 opposite the cap projection 74. In this example, the shoulder 80 extends in a radially outward direction away from the axis 36. As such, the shoulder 80 defines a larger cross-sectional size (e.g., diameter) than the adjacent cap recess 76. The shoulder 80 is shown to be positioned adjacent the welded portion 56. By being adjacent the welded portion 56, it is to be appreciated that the shoulder 80 may or may not be in contact with the welded portion 56.

Turning now to FIGS. 3-7, sequential steps of a method of making the neutron detector 30, in particular attaching the outer shell 40 to the end cap 70, are shown. It is to be appreciated that FIGS. 3-7 depict the first end 32 of the neutron detector 30. However, as set forth above, the first end 32 is generally similar to the second end 34. As such, the following description of forming the neutron detector 30 at the first end 32 is generally similar with respect to the second end 34.

Figure 3:
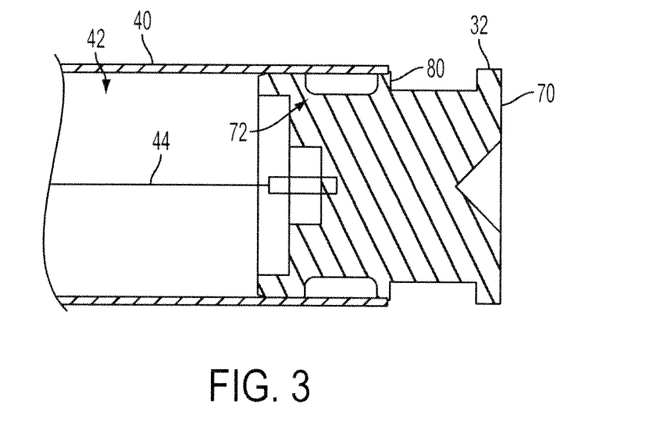
FIG. 3 is an enlarged sectional view of a detail taken at circular section 3 of FIG. 2 of an end of the neutron detector prior to an outer shell being crimped onto an end cap.

Referring to FIG. 3, the method of making the neutron detector 30 includes providing the outer shell 40, acting as a cathode, extending along the axis 36. The outer shell 40 is initially in a tubular shape cross section. In particular, the end of the outer shell 40 has a size/shape that generally matches the size/shape at a center portion of the outer shell 40. Accordingly, the outer shell 40 may not initially include the shell profile 50 at the first end 32. The method of making the neutron detector 30 further includes providing the anode 44 extending along the axis 36 within the outer shell 40.

The method of making the neutron detector 30 includes positioning the end cap 70 within the end of the outer shell 40 to support the anode 44. The end cap 70 includes the cap profile 72 in which the shoulder 80 of the end cap 70 extends in a radially outward direction. The end cap 70 can be inserted at least partially into the interior volume 42 of the outer shell 40 in the longitudinal direction. As shown, the cap profile 72 of the end cap 70 is positioned to extend into the interior volume 42, with the cap profile 72 being located adjacent the outer shell 40. In the shown example, the first end 32 of outer shell 40 may be adjacent and in contact with the shoulder 80 of the cap profile 72. In the shown example, the end cap 70 can be inserted a distance into the outer shell 40 such that the end of the outer shell is in proximity (e.g., radially aligned with) to the shoulder 80 of the end cap 70.

Figure 4:
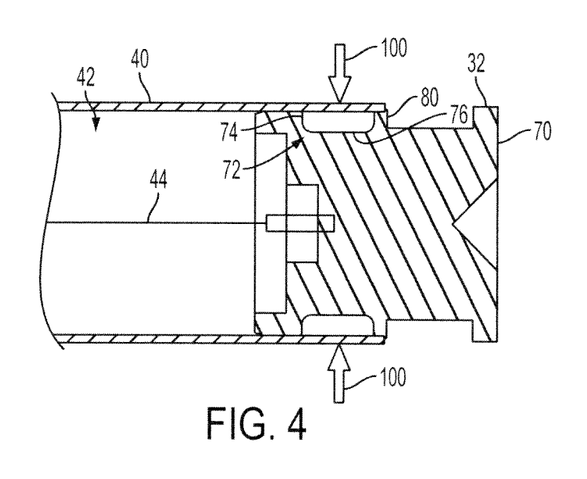
FIG. 4 is an enlarged sectional view similar to FIG. 3 with a force being applied to the outer shell.

Turning now to FIG. 4, the method of making the neutron detector 30 includes crimping a portion of the outer shell 40 to form the shell profile 50 that matches the cap profile 72 of the end cap 70. The welded portion 56 of the outer shell 40 extends in a radially outward direction adjacent the shoulder 80 of the end cap 70. In the illustrated example, a force 100 can be applied to the outer shell 40 to form the shell profile 50. In this example, the force 100 applied to the outer shell 40 is somewhat generically/schematically depicted for illustrative purposes (e.g., with arrowhead). Indeed, it is to be appreciated that the force 100 represents any number of methods for crimping the outer shell 40, including crimping tools, rotary forming tools, manual or automatic force application devices, swaging, etc. The force 100 can be applied from a radially outward direction substantially 360° around the outer shell 40.

The force 100 can be applied a distance from the end of the outer shell 40. In this example, the location of application of the force 100 is longitudinally aligned with the cap recess 76. The force 100 can be applied towards a longitudinal center of the cap recess 76 or, in other examples, closer towards the cap projection 74 or shoulder 80. By applying the force 100 at the location of the cap recess 76, the outer shell 40 is crimped to form the shell profile 50. Further, the force 100 can be sufficient so as to cause bending, yielding, deformation, or the like of the outer shell 40.

Figure 5:
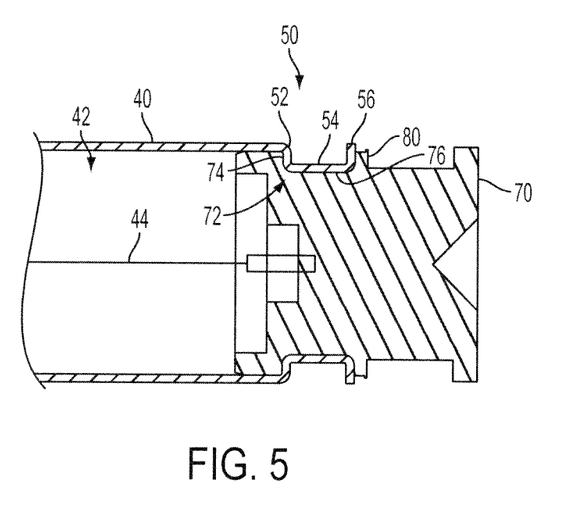
FIG. 5 is an enlarged sectional view similar to FIGS. 3 and 4 with a shell profile formed in the outer shell after the force has been applied.

Turning now to FIG. 5, the first end 32 of the neutron detector 30 is shown after the force 100 has been applied to the outer shell 40. In this example, the shell profile 50 has been formed after the force 100 is applied, with the shell profile 50 generally matching a shape of the cap profile 72. In particular, the force 100 will cause the outer shell 40 to extend into the cap recess 76 and form the recess 54. Likewise, the shell projection 52 will engage and contact the cap projection 74. Further, the welded portion 56 is bent so as to extend in the radially outward direction. In particular, the welded portion 56 extends generally perpendicularly to the axis 36 in a radially outward direction. Accordingly, the welded portion 56 and shoulder 80 extend generally parallel to and in proximity to each other. Due to the shell profile 50 generally matching, and being received within, the cap profile 72, the end cap 70 is limited from moving longitudinally with respect to the outer shell 40.

Figure 6:
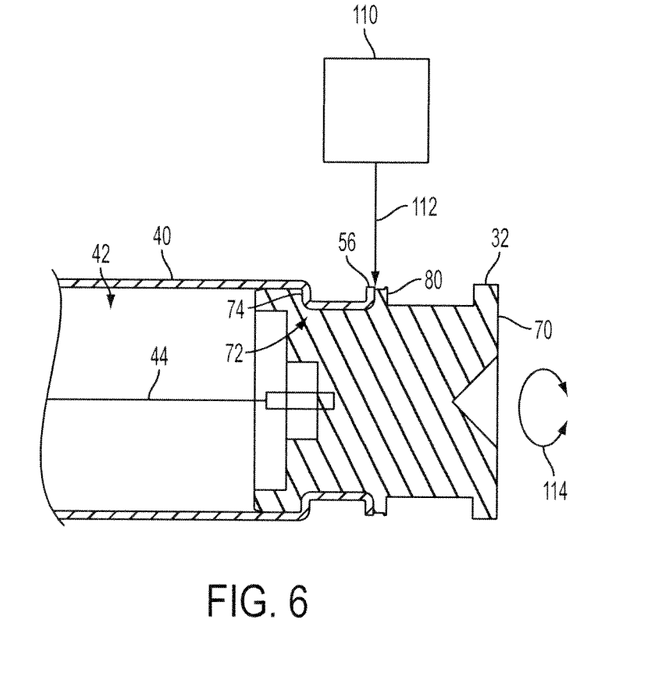
FIG. 6 is an enlarged sectional view similar to FIGS. 3 to 5 depicting an example welding operation to attach the outer shell to the end cap.

Turning now to FIG. 6, the method of making the neutron detector 30 includes welding the welded portion 56 of the outer shell 40 and shoulder 80 of the end cap 70 together from the radially outward direction. FIG. 6 illustrates an example welding operation in which the outer shell 40 is welded to the end cap 70 to form a seal. In particular, a welding device 110 is provided for welding the welded portion 56 to the shoulder 80. It is to be appreciated that the welding device 110 is somewhat generically/schematically depicted for ease of illustration, as the welding device 110 includes any number of devices that are capable of joining materials together. The welding device 110 includes, for example, arc welders, gas welders, torch welders, automated welders, manual welders, or the like. In one example, the welding device 110 includes an automated welder that utilizes mechanized programmable welding tools. In such an example, a portion of the welding device 110 can handle or hold the neutron detector 30 so as to move/rotate the neutron detector 30.

In general, the welding device 110 generates a welding source 112 for joining the outer shell 40 to the end cap 70 and forming a seal. Depending on the type of welding device 110 that is used, the welding source 112 includes an arc, welding torch, oxy-fuel, or the like. The welding source 112 can have sufficient power so as to cause melting and joining of the welded portion 56 and shoulder 80.

The welding source 112 is applied at the location of the welded portion 56 and shoulder 80. In particular, the welding source 112 is applied from a radially outward direction and targeted towards the welded portion 56 and shoulder 80. Due to the welding source 112 being applied from this direction, the welded portion 56 and shoulder 80 are each at least partially heated and consumed, so as to melt and join together. As described above, the radial length 58 of the welded portion 56 is approximately 1.5 millimeters in one example. In this example, the shoulder 80 can have a similar length. As such, by applying the welding source 112 from the radially outward direction, the welded portion 56 and shoulder 80 are consumed along the radial length 58 of the welded portion 56. This allows for a relatively larger weld depth, thus reducing variations and unwelded portions in the weld that is formed.

To provide for a circumferential weld around the neutron detector 30, the neutron detector 30 can be rotated. In this example, the rotation of the neutron detector 30 is somewhat generically depicted as a rotational direction 114 with arrowheads. In one example of operation, the neutron detector 30 is rotated generally 360° about its axis while the welding device 110 remains relatively stationary. In another example of operation, the welding device 110 can be moved along the rotational direction 114 (e.g., 360° around the neutron detector 30) while the neutron detector 30 remains relatively stationary. In either of these examples, it is to be appreciated that the welding source 112 is applied at the welded portion 56 and shoulder 80 circumferentially around the neutron detector 30 so as to form a circumferential weld.

The shell projection 52 is located a distance away from the welded portion 56 and shoulder 80. As set forth above, the recess 54 has a length of approximately 5.842 millimeters (~0.23 inches) in one example. This length (5.842 millimeters) also represents a distance separating the welded portion 56 from the shell projection 52. While other lengths are envisioned, this length is sufficient to improve welding stability by limiting the welding source 112 from inadvertently wandering from the welded portion 56 to the shell projection 52.

Figure 7:
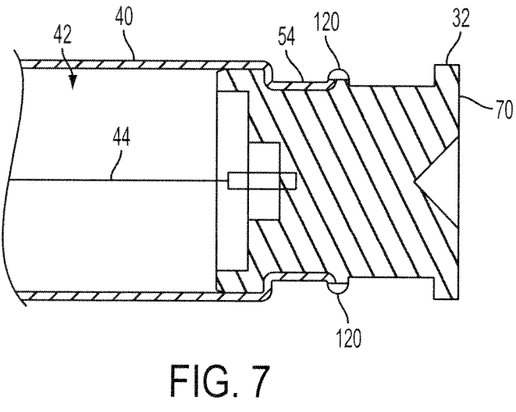
FIG. 7 is an enlarged sectional view similar to FIGS. 3 to 6 depicting the outer shell welded to the end cap after the welding operation.

Turning now to FIG. 7, the neutron detector 30 is shown after the welding operation. In particular, the outer shell 40 is welded to the end cap 70 such that a seal is formed. The seal is somewhat generically depicted as a fused portion 120 in this example. The fused portion 120 extends circumferentially (e.g., 360°) around the neutron detector 30 and represents the joining of the welded portion 56 and the shoulder 80. It is to be appreciated that due to the radially outward welding direction, the fused portion 120 reduces/limits the likelihood of unfused portions (e.g., cracks) existing between the fused outer shell 40 and end cap 70. In particular, even if an unfused portion of the outer shell 40 and end cap 70 exists, the fused portion 120 is generally thick enough to prevent leakage therethrough or any cracks from propagating through.

The neutron detector 30 in the aforementioned examples provides for the welded portion 56 and shoulder 80 extending radially outward. Accordingly, automated welding can be utilized to join the welded portion 56 and shoulder 80, thus improving efficiency by speeding up the welding process. Additionally, a layer of aluminum oxide may be formed on the surfaces of the outer shell 40 and end cap 70 due to the interaction between air and aluminum. Even with this layer of aluminum oxide, the automated welding process can still provide for a generally consistent thickness of the fused portion 120. This is due, at least in part, to the aspect ratio of the radial length 58 of the welded portion 56 to the thickness 60 of the outer shell 40 being greater than or equal to 1.0. Indeed, the radial length 58 allows for the welded portion 56 to be consumed along its length, which is greater than its thickness, during the welding process, thus ensuring an improved fused portion 120.

In addition, the likelihood of the welding source 112 wandering to other portions of the outer shell 40 or end cap 70 is also reduced, thus ensuring a more consistent fused portion 120. For instance, the welded portion 56 is separated a distance from the shell projection 52. Accordingly, the welding source 112 (e.g., arc, torch, etc.) is limited from inadvertently wandering from the welded portion 56 to the shell projection 52.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A detector including:
   an outer shell having a shell profile in which a welded portion of the shell profile extends as an annular flange in an outward direction relative to a center axis of the outer shell; and
   an end cap positioned adjacent the welded portion of the outer shell, the end cap and the welded portion of the outer shell being configured to be welded together to form a seal.

2. The detector of claim 1, wherein the end cap includes a welded annular shoulder such that the welded annular shoulder and the welded portion of the outer shell are configured for automatic welding and are welded together as part of an automated welding process.

3. The detector of claim 1, wherein the shell profile of the outer shell includes an annular recess positioned between the welded portion on one longitudinal side along the axis and a shell projection on an opposing longitudinal side along the axis.

4. The detector of claim 3, wherein the end cap includes a cap profile that substantially matches at least a portion of the shell profile.

5. The detector for claim 4, wherein the cap profile includes a cap recess positioned between the shoulder on one longitudinal side along the axis and a cap projection on an opposing longitudinal side along the axis.

6. The detector of claim 5, wherein the welded portion of the outer shell is positioned longitudinally adjacent and in contact with the shoulder.

7. The detector of claim 6, wherein the shell profile has an aspect ratio of a radial length of the welded portion to a thickness of the outer shell of at least 1.0.

8. The detector of claim 7, wherein the radial length of the welded portion is approximately 1.5 millimeters and the thickness of the outer shell is approximately 0.9 millimeters.

9. The detector of claim 1, wherein a welded annular shoulder of the end cap and the welded portion of the outer shell are configured to for welding from a radial direction and are welded together as part of a welding process directed from a radial direction.

10. A detector including:
an outer shell, acting as a cathode, extending along an axis, the outer shell having a shell profile in which a welded portion of the shell profile extends as an annular flange in a radially outward direction relative to the axis;
an anode extending along the axis within the outer shell; and
an end cap supporting the anode and extending within an end of the outer shell, the end cap including a cap profile that matches the shell profile of the outer shell, wherein the end cap includes a welded annular shoulder that extends radially outward with relative to the axis, and the welded shoulder and the welded portion of the outer shell are adjacent each other and welded together to form a seal.

11. The detector of claim 10, wherein the shoulder and the welded portion of the outer shell are configured to for welding from a radial direction and are welded together as part of a welding process directed from a radial direction.

12. The detector of claim 11, wherein the shoulder and the welded portion of the outer shell are configured to for automatic welding and are welded together as part of an automated welding process.

13. The detector of claim 10, wherein the shell profile of the outer shell includes a recess positioned between the welded portion on one longitudinal side along the axis and a shell projection on an opposing longitudinal side along the axis.

14. The detector of claim 13, wherein the shell projection is spaced a distance apart from the welded portion such that the shell projection is not welded.

15. The detector of claim 10, wherein the radial length of the welded portion is approximately 1.5 millimeters and the thickness of the outer shell is approximately 0.9 millimeters.

16. The detector of claim 10, wherein the shell profile has an aspect ratio of a radial length of the welded portion to a thickness of the outer shell of at least 1.0.

17. A method of making a detector, the method including:
providing an outer shell, acting as a cathode, extending along an axis,
providing an anode extending along the axis within the outer shell;
positioning an end cap within an end of the outer shell to support the anode, the end cap including a cap profile in which a shoulder of the end cap extends in a radially outward direction;
crimping a portion of the outer shell to form a shell profile that matches the cap profile of the end cap, wherein a welded portion of the outer shell extends in a radially outward direction adjacent the shoulder of the end cap; and
welding the welded portion of the outer shell and shoulder of the end cap together from the radially outward direction.

18. The method of claim 17, further including rotating the neutron detector during the step of welding such that the outer shell and shoulder are welded at substantially 360° around the neutron detector.

19. The method of claim 18, wherein the outer shell and end cap are hermetically sealed.

20. The method of claim 17, wherein the shell profile has an aspect ratio of a radial length of the welded portion to a thickness of the outer shell of at least 1.0.

* * * * *